(12) United States Patent
Klassen et al.

(10) Patent No.: US 8,868,044 B2
(45) Date of Patent: Oct. 21, 2014

(54) METHOD AND APPARATUS FOR DYNAMIC SESSION PLACEHOLDER FOR MESSAGE COLLECTION USER INTERFACE

(71) Applicant: Research in Motion Limited, Waterloo (CA)

(72) Inventors: Gerhard Deitrich Klassen, Waterloo (CA); Shaul Wisebourt, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/756,747

(22) Filed: Feb. 1, 2013

(65) Prior Publication Data

US 2013/0191760 A1     Jul. 25, 2013

Related U.S. Application Data

(63) Continuation of application No. 13/344,080, filed on Jan. 5, 2012, now Pat. No. 8,396,454, which is a continuation of application No. 12/685,737, filed on Jan. 12, 2010, now Pat. No. 8,116,739, which is a continuation of application No. 12/193,909, filed on Aug. 19, 2008, now Pat. No. 7,672,663, which is a continuation of application No. 11/154,533, filed on Jun. 17, 2005, now Pat. No. 7,430,409.

(51) Int. Cl.
| | |
|---|---|
| *H04M 1/725* | (2006.01) |
| *H04L 12/58* | (2006.01) |
| *G06Q 10/10* | (2012.01) |
| *G06F 3/0484* | (2013.01) |

(52) U.S. Cl.
CPC ............ *G06F 3/0484* (2013.01); *H04L 12/586* (2013.01); *G06Q 10/107* (2013.01); *H04L 51/16* (2013.01)

USPC ............. 455/412.1; 455/412.2; 455/566; 455/550.1; 455/556.1; 455/575.1; 709/204; 709/205; 709/206; 709/203; 709/207; 345/156; 345/169

(58) Field of Classification Search
USPC ............. 455/412.1, 412.2, 566, 550.1, 575.1, 455/556.1, 556.2, 557, 426.1, 426.2, 466, 455/418–420; 709/204, 205, 206, 203, 207, 709/218, 219, 213; 345/156, 169
See application file for complete search history.

(56) References Cited

U.S. PATENT DOCUMENTS

| | | |
|---|---|---|
| 6,539,421 B1 | 3/2003 | Appelman et al. |
| 8,484,216 B2 * | 7/2013 | Berry et al. .................. 707/737 |
| 2002/0126146 A1 | 9/2002 | Burns et al. |

(Continued)

OTHER PUBLICATIONS

United States Patent and Trademark Office, Notice of Allowance dated Nov. 20, 2012, issued in U.S. Appl. No. 13/344,080.

(Continued)

*Primary Examiner* — Keith Ferguson
(74) *Attorney, Agent, or Firm* — Norton Rose Fulbright Canada LLP

(57) ABSTRACT

A method and apparatus for representing a conversation of related messages is provided. In a message collection user interface for displaying messages sent and received by a communications device, a dynamic session placeholder is used for a respective conversation of related messages. The message collection user interface is displayed including any dynamic session placeholders in the list of messages. As messages from the conversation are occasioned, the dynamic session placeholder is updated. When the message collection is displayed, it is displayed in accordance with the updated session placeholder.

30 Claims, 7 Drawing Sheets

(56) References Cited

U.S. PATENT DOCUMENTS

| | | | |
|---|---|---|---|
| 2003/0013483 | A1 | 1/2003 | Ausems et al. |
| 2003/0130014 | A1 | 7/2003 | Rucinski |
| 2004/0015548 | A1 | 1/2004 | Lee |
| 2004/0078435 | A1 | 4/2004 | Dunbar et al. |
| 2004/0260756 | A1 | 12/2004 | Forstall et al. |
| 2005/0101338 | A1 | 5/2005 | Kraft |
| 2005/0144237 | A1 | 6/2005 | Heredia et al. |
| 2010/0048231 | A1* | 2/2010 | Donald et al. ............ 455/466 |

OTHER PUBLICATIONS

State Intellectual Property Office of People's Republic of China, Office Action dated Dec. 5, 2012, issued in Chinese Patent Application No. 200910132899.1, English translation.
European Patent Office, Extended European Search Report pursuant to Rule 62 EPC; EP 10181395.4, dated Nov. 19, 2010.
State Intellectual Property Office of People's Republic of China, Office Action dated Apr. 26, 2011, issued in respect of Indian Patent Application No. 200910132899.1, together with the English translation thereof.
Barker Brettell, Response to Extended European Search Report, filed Jul. 5, 2011, in respect of European Patent Application No. 10181395.4.
Canadian Intellectual Property Office, Office Action issued in respect of Canadian Patent Application No. 2,550,367, dated Oct. 23, 2008.
Ogilvy Renault, Response filed in respect of Canadian Patent Application No. 2,550,367, dated Apr. 15, 2009.
Canadian Intellectual Property Office, Office Action issued in respect of Canadian Patent Application No. 2,550,367, dated Jul. 2, 2009.
Ogilvy Renault, Response filed in respect of Canadian Patent Application No. 2,550,367, dated Nov. 12, 2009.
Ogilvy Renault, Response filed in respect of Canadian Patent Application No. 2,550,367, dated Nov. 16, 2010.
Canadian Intellectual Property Office, Office Communication issued in respect of Canadian Patent Application No. 2,550,367, dated Dec. 2, 2010.
Ogilvy Renault, Amendment filed in respect of Canadian Patent Application No. 2,550,367, dated Jan. 5, 2011.
Canadian Intellectual Property Office, Office Communication issued in respect of Canadian Patent Application No. 2,550,367, dated Feb. 10, 2011.
Ogilvy Renault, Response filed in respect of Canadian Patent Application No. 2,550,367, dated Feb. 18, 2011.
Canadian Intellectual Property Office, Office Communication issued in respect of Canadian Patent Application No. 2,550,367, dated Apr. 7, 2011.
State Intellectual Property Office of People's Republic of China, Office Communication issued in respect of Chinese Patent Application No. 200610143182.3, dated Dec. 14, 2007 and an English translation thereof.
State Intellectual Property Office of People's Republic of China, Office Communication issued in respect of Chinese Patent Application No. 200610143182.3, dated Jun. 27, 2008 and an English translation thereof.
State Intellectual Property Office of People's Republic of China, Office Communication issued in respect of Chinese Patent Application No. 200610143182.3, dated Feb. 13, 2009 and an English translation thereof.
Canadian Intellectual Property Office, Notice of Allowance dated Jan. 29, 2010, issued in respect of Canadian Patent Application No. 2,550,367.
United States Patent and Trademark Office, Office Action dated Nov. 2, 2006, issued in respect of U.S. Appl. No. 11/154,533.
Ogilvy Renault, Response to Office Action dated Jan. 30, 2007, filed in respect of U.S. Appl. No. 11/154,533.
United States Patent and Trademark Office, Office Action dated May 2, 2007, issued in respect of U.S. Appl. No. 11/154,533.
Ogilvy Renault, Response to Office Action dated Jun. 28, 2007, filed in respect of U.S. Appl. No. 11/154,533.
United States Patent and Trademark Office, Office Action dated Jul. 25, 2007, issued in respect of U.S. Appl. No. 11/154,533.
Ogilvy Renault, Response to Office Action dated Oct. 22, 2007, filed in respect of U.S. Appl. No. 11/154,533.
United States Patent and Trademark Office, Office Action dated Jan. 9, 2008, issued in respect of U.S. Appl. No. 11/154,533.
Ogilvy Renault, Response to Office Action dated Mar. 17, 2008, filed in respect of U.S. Appl. No. 11/154,533.
United States Patent and Trademark Office, Notice of Allowance dated Jul. 1, 2008, issued in respect of U.S. Appl. No. 11/154,533.
Ogilvy Renault, Response to Notice of Allowance and Interview Summary dated Aug. 19, 2008, filed in respect of U.S. Appl. No. 11/154,533.
United States Patent and Trademark Office, Office Action dated Jun. 30, 2009, issued in respect of U.S. Appl. No. 12/193,909.
Ogilvy Renault, Response to Office Action dated Sep. 11, 2009, filed in respect of U.S. Appl. No. 12/193,909.
Ogilvy Renault, Terminal Disclaimer dated Sep. 11, 2009, filed in respect of U.S. Appl. No. 12/193,909.
United States Patent and Trademark Office, Notice of Allowance dated Oct. 13, 2009, issued in respect of U.S. Appl. No. 12/193,909.
European Patent Office, European Search Report dated Feb. 28, 2006, issued in respect of European Patent Application No. 05105409.6.
Ipulse, Response to European Search Report dated Jun. 13, 2006, filed in respect of European Patent Application No. 05105409.6.
European Patent Office, Examination Report dated Jul. 8, 2009, issued in respect of European Patent Application No. 05105409.6.
Barker Brettel, Response to Examination Report dated Oct. 22, 2009, filed in respect of European Patent Application No. 05105409.6.
Gmailthreadingdetails-jmason.org Wiki, GMail Threading Details, http://taint.org/wk/GmailThreadingDetails, published Apr. 28, 2004.
This is Sippey.com: 14 Entries From Apr. 2004, This is sippey.com—let's make a sandwich, http://www.sippey.com/2004/04/#tp, published Apr. 29, 2004.
Emailusabilitywishlist-jmason.org Wiki, Some email usability ideas, http://taint.org/wk/EmailUsabilityWishlist?action=AttachFile, published Apr. 13, 2004.
Using Your Treo, Includes setup information and instructions for most tasks, PalmOne, 2004.
United States Patent and Trademark Office, Office Action dated Aug. 12, 2011, issued in respect of U.S. Appl. No. 12/685,737.
Norton Rose or, Response to Office Action filed Sep. 15, 2011, in respect of U.S. Appl. No. 12/685,737.
United States Patent and Trademark Office, Notice of Allowance dated Nov. 1, 2011, issued in respect of U.S. Appl. No. 12/685,737.
Allen & Gledhill, Voluntary Amendment filed Mar. 22, 2012, in respect of Singapore Application No. 200809214-0.
Norton Rose, Preliminary Amendment filed Mar. 6, 2012, in respect of U.S. Appl. No. 13/344,080.
State Intellectual Property Office of People's Republic of China, Second Office Action dated May 3, 2012, issued in Chinese Patent Application No. 200910132899.1.
United States Patent and Trademark Office, Office Action dated May 23, 2012, issued in U.S. Appl. No. 13/344,080.
Norton Rose, Response to Office Action dated Aug. 22, 2012, filed in U.S. Appl. No. 13/344,080.
United States Patent and Trademark Office, Office Action dated Oct. 23, 2012, issued in U.S. Appl. No. 13/344,080.
Norton Rose, Response to Office Action dated Nov. 2, 2012, filed in U.S. Appl. No. 13/344,080.
State Intellectual Property Office of People's Republic of China, 4th Office Action dated Jul. 1, 2013, issued in Chinese Patent Application No. 200910132899.1., together with the English translation thereof.
European Patent Office, Communication pursuant to Article 94(3) EPC dated Mar. 19, 2014, issued in corresponding European patent application No. 05105409.6.
Government of India Patent Office, First Examination Report dated Jan. 11, 2014, issued in corresponding patent application No. 1430/DEL/2006.
Microsoft, View messages by conversation or thread, http://office.microsoft.com/en-us/outlook-help/view-messages-by . . . , Mar. 11, 2014.
Google Search, View messages by thread, https://www.google.com/search?q=view+by+thread&clie . . . , Mar. 11, 2014.

* cited by examiner

METHOD AND APPARATUS FOR DYNAMIC SESSION PLACEHOLDER FOR MESSAGE COLLECTION USER INTERFACE

FIELD OF THE INVENTION

The present application relates to a user interface for a messaging application and more particularly for method and apparatus for a dynamic session placeholder for a message collection user interface.

BACKGROUND OF THE INVENTION

Currently user interfaces, particularly graphical user interfaces (GUI) for displaying and accessing messages such as various types of data and voice messages communicated between a first communications device and one or more other devices are of a "linear" nature. One common manner of presenting the messages to a user of one of the devices comprises a message collection application having a GUI which contains entries that correspond to messages on one-by-one basis. The messages are often presented in accordance with a chronological order of the message such as time sent or received. Often this linear and singular presentation format causes the message collection GUI to be overstuffed with single messages.

The GUI makes it difficult for the user to find a particular message, reply to a particular message in a "thread" (i.e. common subject) having a context of all the previous messages, or track the "thread history", because different messages of the same "thread" can be spread throughout the message collection GUI and can be separated by other messages from different "threads". Commonly available message collection GUI's for communications devices include various email and unified message applications such as Microsoft Outlook®, Lotus Notes® and others such as Blackberry message collection for wireless communication devices.

A solution to one or more of these needs is therefore desired.

BRIEF DESCRIPTION OF THE DRAWINGS

In order that the subject matter may be readily understood, embodiments are illustrated by way of examples in the accompanying drawings, in which:

FIG. 6 is a representative GUI display view of a message collection application showing an instant messaging (IM) session between a user and opposite IM party;

FIG. 7 is a representative GUI display view of a message collection application showing a dynamic session placeholder in accordance with an embodiment;

FIG. 8 is a representative GUI display view of a message collection application showing receipt of a new SMS message subsequent to a previous message represented by a dynamic session placeholder;

FIG. 9 is a representative GUI display view of a message collection application showing an updated dynamic session placeholder in accordance with an embodiment;

FIG. 10 is a representative GUI display view of a message collection application showing a dynamic session placeholder message entry selected for action in accordance with an embodiment;

FIG. 11 is a representative GUI display view of a message collection application showing an IM session having a pop-up list of actions for an IM application; and FIG. 12 is a representative GUI display view with dynamic session entry removed.

DETAILED DESCRIPTION

Persons of ordinary skill in the art will appreciate that teachings herein are applicable to messages received via wired or wireless communication and though a wireless communication device and network are discussed in the examples, no limitations should be imposed. As noted in FIG. 6, aspects of the example GUI shown in FIG. 6, while forming a useful part of the disclosed message collection application, may be considered to be within the prior art.

Related messages of a conversation are represented as a part of a session. Different sessions may be directly accessed from a message collection GUI. A particular session or conversation is represented in a message collection with a single dynamic placeholder. This allows a user to get access to all the context related messages in "one shot": from the placeholder straight into the active session (conversation). A session's placeholder dynamically updates it's position in the message collection using the timestamp of the last message of the conversation as a criteria. Conversations that are started but which have not occasioned recent activity will automatically age to the bottom of the message collection GUI, leaving the top of the message collection GUI for active sessions defining a hot spot of context related messages. A placeholder may be removed from the message collection GUI as a session is interrupted (i.e. terminated). As such only valid (active) sessions in the message collection GUI need be maintained to avoid wasting resources. Terminated sessions may be optionally archived.

Figure 1:
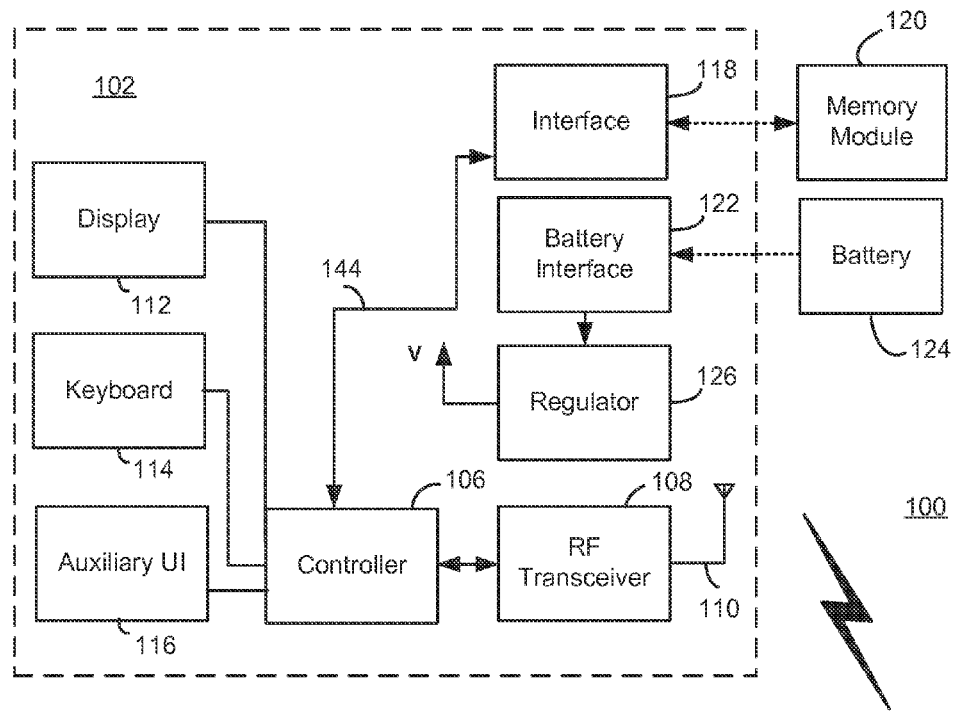
FIG. 1 is a block diagram which illustrates pertinent components of an example wireless communication network and a mobile station which communicates within this network.
Figure 1:
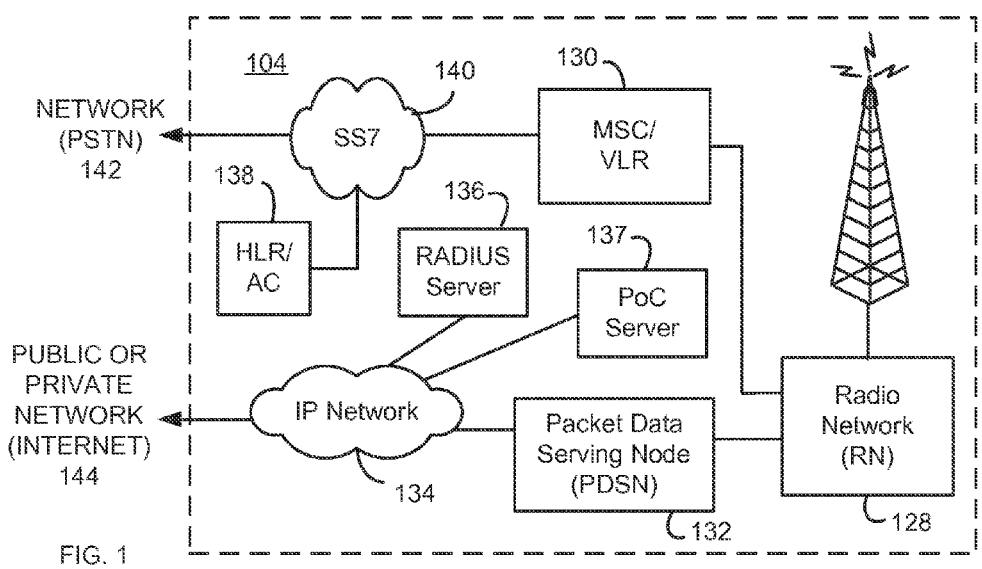

FIG. 1 is a block diagram of a communication system 100 which includes a mobile station 102 which communicates through a wireless communication network 104. Mobile station 102 preferably includes a visual display 112, a keyboard 114, and perhaps one or more auxiliary user interfaces (UI) 116, each of which is coupled to a controller 106. Controller 106 is also coupled to radio frequency (RF) transceiver circuitry 108 and an antenna 110.

Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of a radio network (RN) 128, including for example modulation/demodulation and possibly encoding/decoding and encryption/decryption. It is also contemplated that RF transceiver circuitry 108 may perform certain functions in addition to those performed by RN 128. It will be apparent to those skilled in art that RF transceiver circuitry 108 will be adapted to particular wireless network or networks in which mobile station 102 is intended to operate.

Mobile station 102 includes a battery interface 122 for receiving one or more rechargeable batteries 124. Battery 124 provides electrical power to electrical circuitry in mobile station 102, and battery interface 122 provides for a mechanical and electrical connection for battery 124. Battery interface 122 is coupled to a regulator 126 which regulates power to the device. When mobile station 102 is fully operational, an RF transmitter of RF transceiver circuitry 108 is typically turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 operates using a memory module 120, such as a Subscriber Identity Module (SIM) or a Removable User Identity Module (R-UIM), which is connected to or inserted in mobile station 102 at an interface 118. As an alternative to a SIM or an R-UIM, mobile station 102 may operate based on configuration data programmed by a service provider into an internal memory which is a non-volatile memory. Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, and one or more auxiliary UIs 116, and controller 106 may remain within the radio modem unit that communicates with the computer's CPU or be embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Mobile station 102 communicates in and through wireless communication network 104. In the embodiment of FIG. 1, wireless network 104 is a Third Generation (3G) supported network based on Code Division Multiple Access (CDMA) technologies. In particular, wireless network 104 is a CDMA2000 network which includes fixed network components coupled as shown in FIG. 1. Wireless network 104 of the CDMA2000-type includes a Radio Network (RN) 128, a Mobile Switching Center (MSC) 130, a Signaling 7 System 7 (SS7) network 140, a Home Location Register/Authentication Center (HLR/AC) 138, a Packet Data Serving Node (PDSN) 132, an IP network 134, and a Remote Authentication Dial-In User Service (RADIUS) server 136. SS7 network 140 is communicatively coupled to a network 142 (such as a Public Switched Telephone Network or PSTN), whereas IP network is communicatively coupled to a network 144 (such as the Internet). Persons of ordinary skill in the art will appreciate that other networks and associated topologies including GPRS, E-GPRS and UMTS radio networks, among many others, may be employed with the teachings herein.

During operation, mobile station 102 communicates with RN 128 which performs functions such as call-setup, call processing, and mobility management. RN 128 includes a plurality of base station transceiver systems that provide wireless network coverage for a particular coverage area commonly referred to as a "cell". A given base station transceiver system of RN 128, such as the one shown in FIG. 1, transmits communication signals to and receives communication signals from mobile stations within its cell. The base station transceiver system normally performs such functions as modulation and possibly encoding and/or encryption of signals to be transmitted to the mobile station in accordance with particular, usually predetermined, communication protocols and parameters, under control of its controller. The base station transceiver system similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks. The underlying services may also differ based on its particular protocol revision.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells depending upon desired overall expanse of network coverage. All pertinent components may be connected by multiple switches and routers (not shown), controlled by multiple network controllers.

For all mobile stations 102 registered with a network operator, permanent data (such as mobile station 102 user's profile) as well as temporary data (such as mobile station's 102 current location) are stored in a HLR/AC 138. In case of a voice call to mobile station 102, HLR/AC 138 is queried to determine the current location of mobile station 102. A Visitor Location Register (VLR) of MSC 130 is responsible for a group of location areas and stores the data of those mobile stations that are currently in its area of responsibility. This includes parts of the permanent mobile station data that have been transmitted from HLR/AC 138 to the VLR for faster access. However, the VLR of MSC 130 may also assign and store local data, such as temporary identifications. Mobile station 102 is also authenticated on system access by HLR/AC 138. In order to provide packet data services to mobile station 102 in a CDMA2000-based network, RN 128 communicates with PDSN 132. PDSN 132 provides access to the Internet 144 (or intranets, Wireless Application Protocol (WAP) servers, etc.) through IP network 134. PDSN 132 also provides foreign agent (FA) functionality in mobile IP networks as well as packet transport for virtual private networking. PDSN 132 has a range of IP addresses and performs IP address management, session maintenance, and optional caching. RADIUS server 136 is responsible for performing functions related to authentication, authorization, and accounting (AAA) of packet data services, and may be referred to as an AAA server.

Wireless communication network 104 also includes a Push-to-talk over Cellular (PoC) server 137 which may be coupled to IP network 134. PoC server 137 operates to facilitate PoC individual and group communication sessions between mobile stations within network 104. A conventional PoC communication session involves a session connection between end users of mobile stations, referred to as session "participants", who communicate one at a time in a half-duplex manner much like conventional walkie-talkies or two-way radios.

Those skilled in art will appreciate that wireless network 104 may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
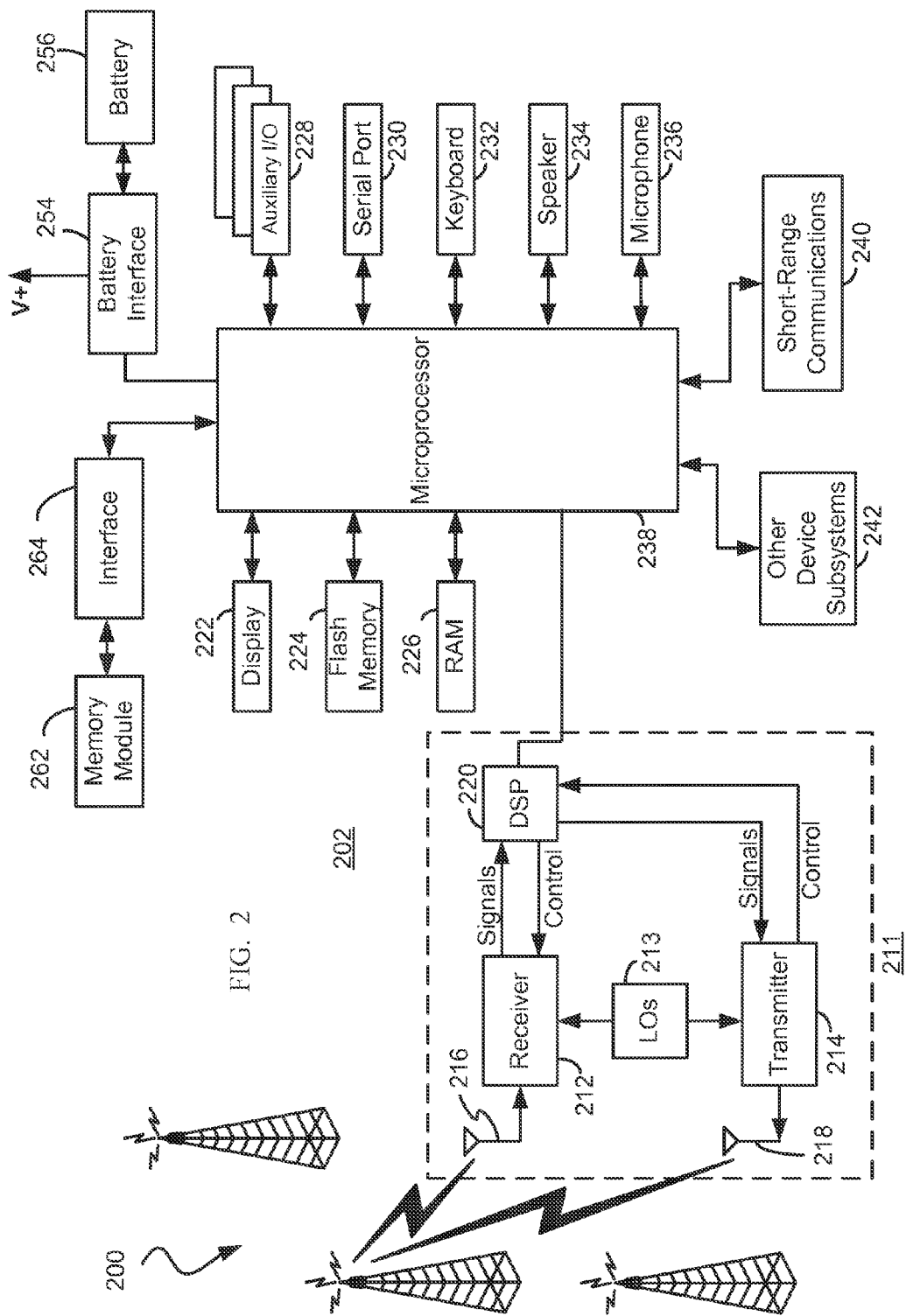
FIG. 2 is a more detailed diagram of the mobile station which may communicate within the wireless communication network.

FIG. 2 is a detailed block diagram of a preferred mobile station 202. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of base station transceiver systems 200 within its geographic coverage area.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a memory module 262, such as a Subscriber Identity Module or "SIM" card or a Removable User Identity Module (R-UIM), to be inserted in or connected to an interface 264 of mobile station 202 in order to operate in the network. Alternatively, memory module 262 may be a non-volatile memory which is programmed with configuration data by a service provider so that mobile station 202 may operate in the network. Since mobile station 202 is a mobile battery-powered device, it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown in FIG. 2) which provides power V+ to all of the circuitry.

Mobile station 202 includes a microprocessor 238 (which is one implementation of controller 106 of FIG. 1) which controls overall operation of mobile station 202. This control includes network selection techniques of the present application. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 262 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

One function of PIM is to provide a GUI for accessing messages received or sent by station 202. A message collection application is an example of a user interface for displaying different types of messages received and sent by mobile station 202.

Figure 5:
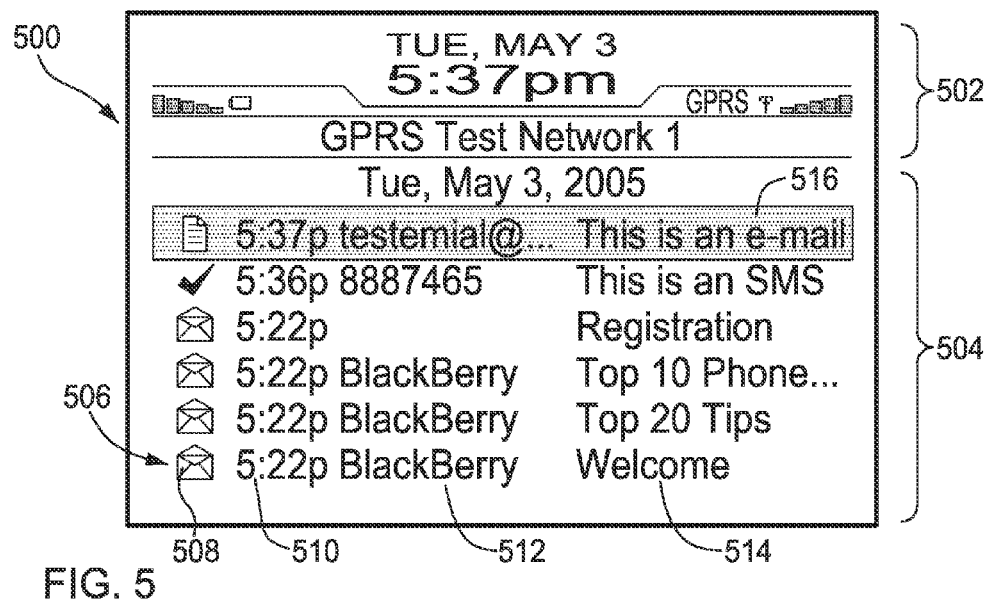
FIGS. 5-12 are representative GUI display views of a message collection application showing various examples of message operations in accordance with an embodiment.

FIG. 5 illustrates an example view 500 of a message collection application adapted in accordance with an embodiment. View 500 comprises a device status portion 502 for showing various device status information such as battery level, wireless network signal level, current time and date, etc., in contrast to message collection application specific information. View 500 further comprises message collection application information 504 including a list of messages sent or received by station 202 such as exemplary message 506. Each message entry in the list typically comprises an icon 508 representative of the type of message comprising the entry, a time of action 510 (e.g. time sent or received), an opposite message party 512 (e.g. sender for a received messages and intended recipient for a sent message) and a brief portion of the message or description thereof 514. Less or additional information may also be provided (e.g. message importance, attachment indicator, size, etc.). Messages in the list may be navigated and selected for operations by moving a focus about the list such as via a thumb wheel or other input device 228. The focus may be represented in various ways such as reverse display mode 516.

Figure 6:
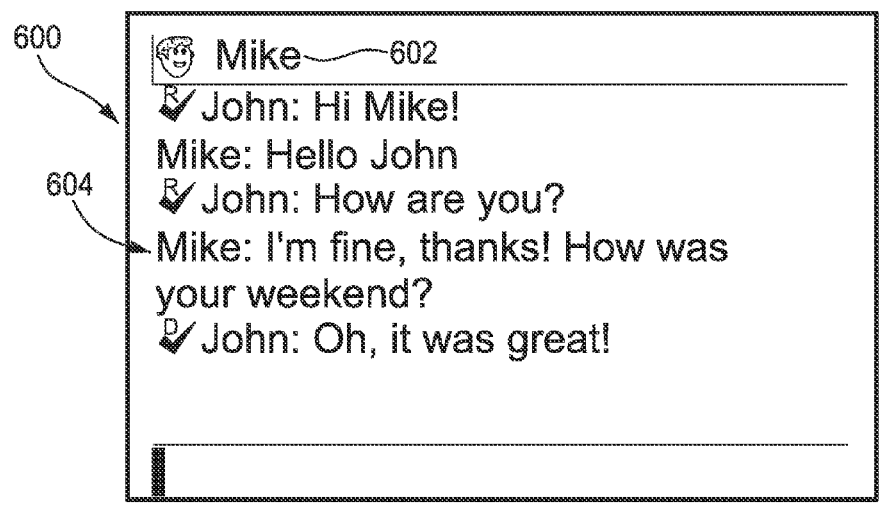
Figure 7:
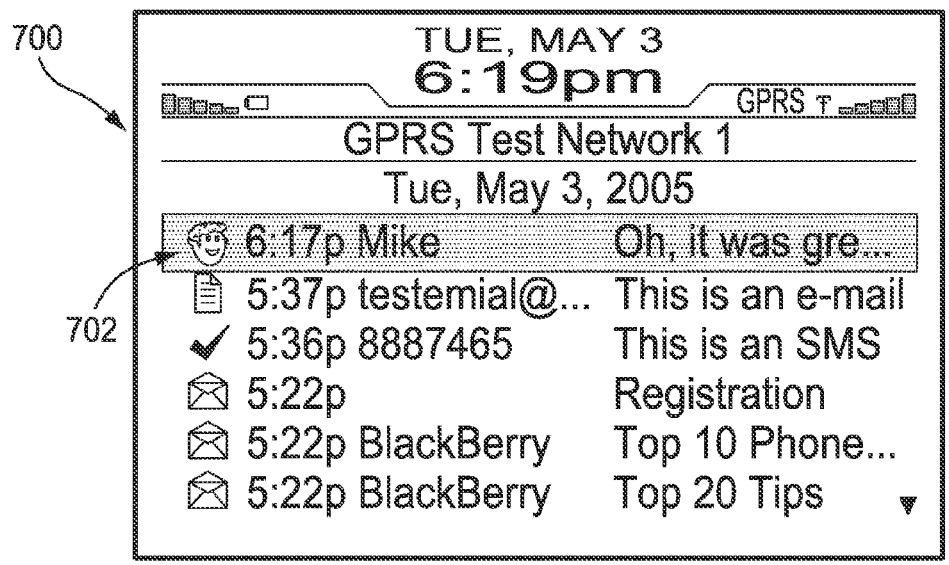
Figure 8:
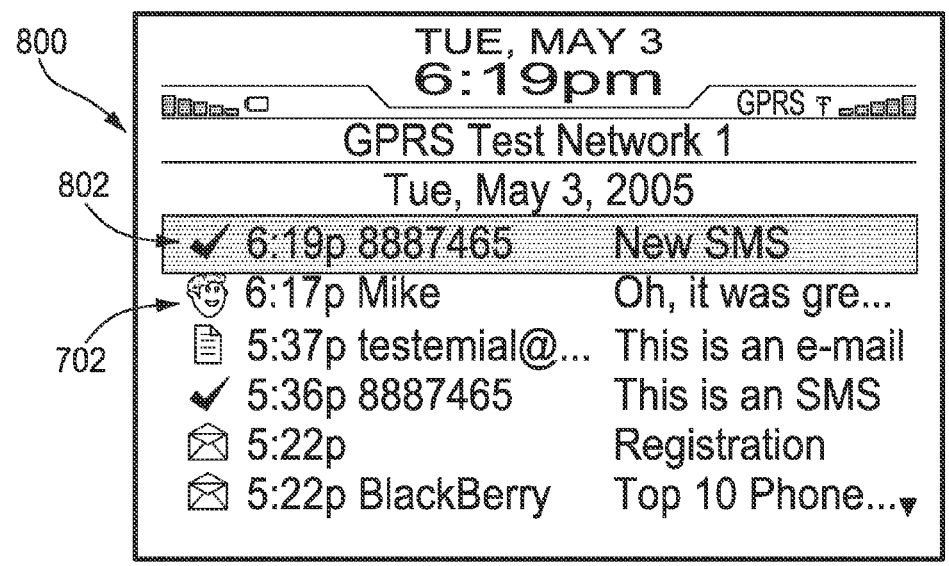

In accordance with one feature, messages from a common communication session may be grouped and represented in the message collection with as a single entry via a dynamic placeholder for the session. FIG. 6 illustrates an instant messaging (IM) session between a user "John" of mobile station 202 and an opposite IM party "Mike" in accordance with the prior art. Representative IM view 600 shows a plurality of IM messages in a conversation with user "Mike" 602 in a similar linear mode 604 to prior art message collection applications. Rather than represent each message of an IM conversation in a unified message collection such as view 500, a single dynamic message collection entry may be defined and maintained during the message session. FIG. 7 illustrates a view 700 of the message collection application showing a dynamic session placeholder 702 as a single entry of the messages list for representing the entire IM session. As new messages are received or sent via station 202, corresponding message entries may be added for presenting to the user via the message collection application. FIG. 8 shows the receipt of a new SMS message 802 subsequent to the last time or a message represented by dynamic session placeholder 702. Thus a dynamic session placeholder may age in a similar manner to regular message entries. Older conversations move down the list while newer messages and sessions are at the top of the list.

Figure 9:
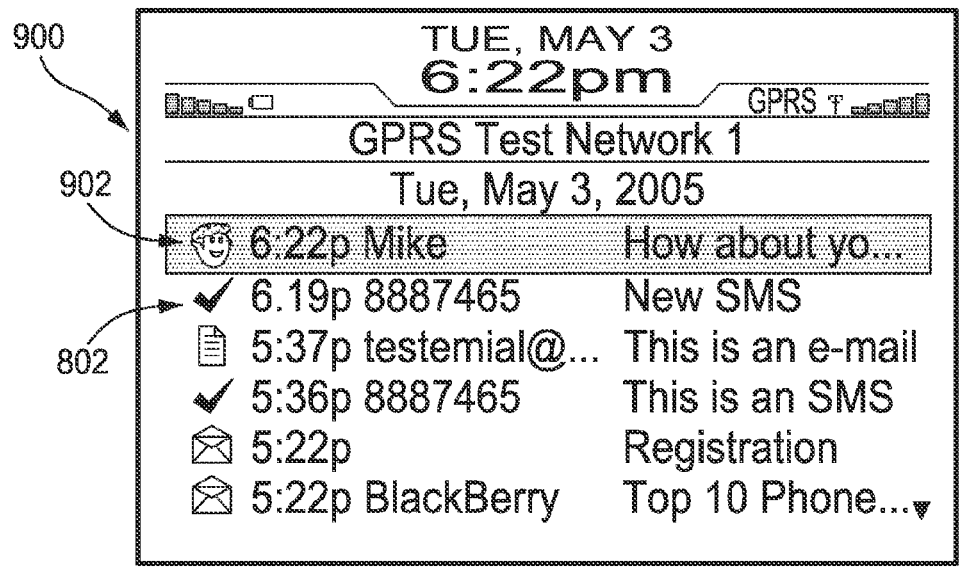

However, should new activity occur with a session (e.g. receiving or sending of a message), the time stamp of the dynamic session placeholder is updated and its position in the message collection changed accordingly. FIG. 9 shows a view 900 of the message collection with an updated dynamic session placeholder 902 in order ahead of aged SMS message 802. Message 702 (now message 902) is "removed" accordingly.

Figure 10:
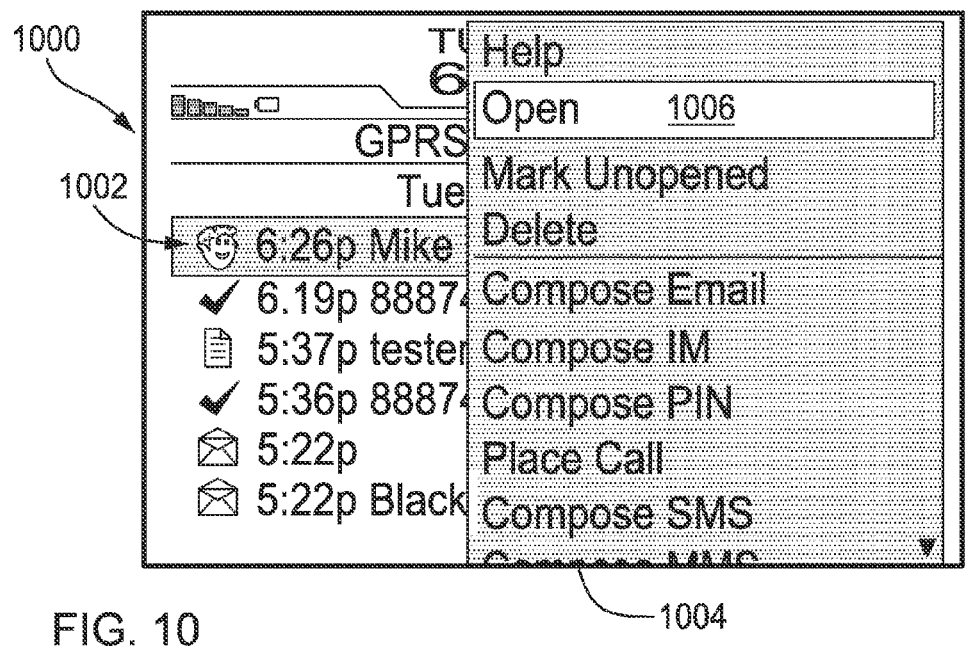

As noted previously, particular message entries may be selected individually or in a group for action. FIG. 10 illustrates a view 1000 of the message collection application showing a dynamic session placeholder message entry 1002 selected for action. A pop-up selection list 1004 is activated to present a user with choices for the particular message entry (e.g. Open, Mark Unopened, Delete) as well as various actions which may be invoked from the message collection application (e.g. various message compose options, search options, message collection preference options, etc.). Open option 1006 may be invoked to launch an IM application (e.g. view 600) to open the particular session associated with the dynamic placeholder to view or otherwise maintain the conversation. Further messages may be composed and sent (not shown) or received messages reviewed, etc. as is well known.

Figure 11:
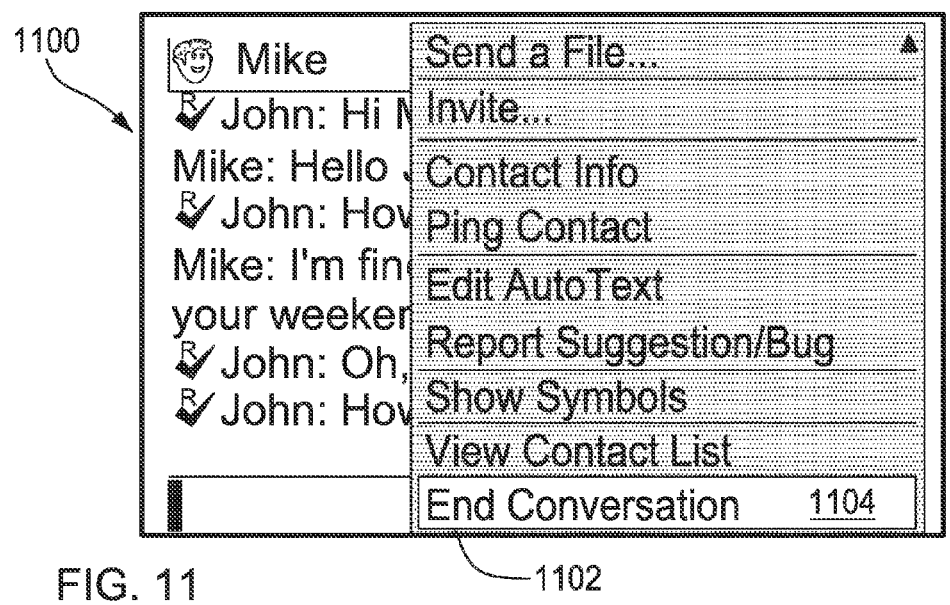
Figure 12:
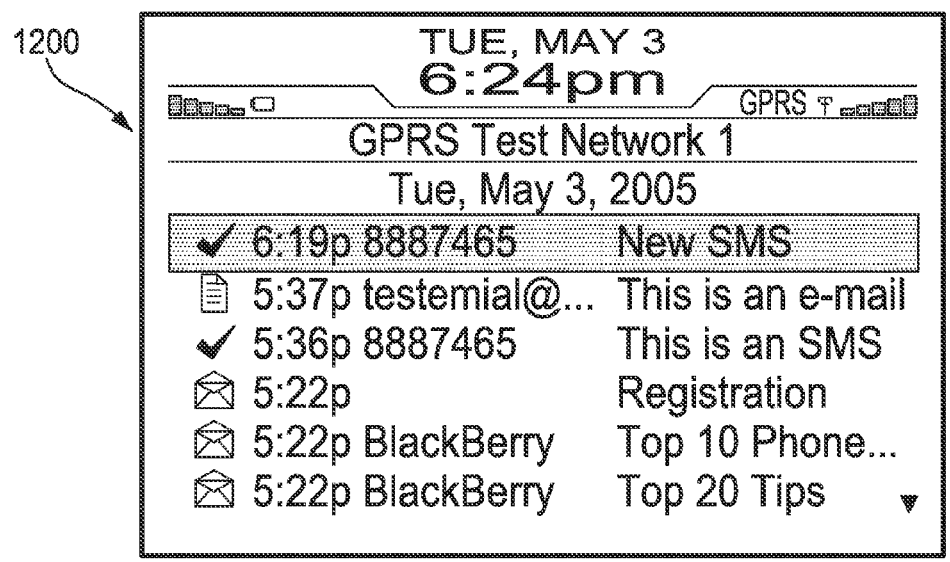

Should a session terminate, the dynamic session placeholder is preferably removed from the message collection. FIG. 11 shows a view 1100 of an IM session having a pop-up list 1102 of actions for the IM application. One action is End Conversation 1104 to terminate the IM session. Invoking this action preferably updates the dynamic session placeholder to have it removed from display by the message collection application. In this way only active sessions are maintained in the message collection GUI to free storage space and entries in the list. Optionally, a session which become inactive may be archived or otherwise persisted for viewing, printing etc. if desired. FIG. 12 illustrates a view 1200 with dynamic session entry 902 removed following an End Conversation 1104 action.

Figure 3:
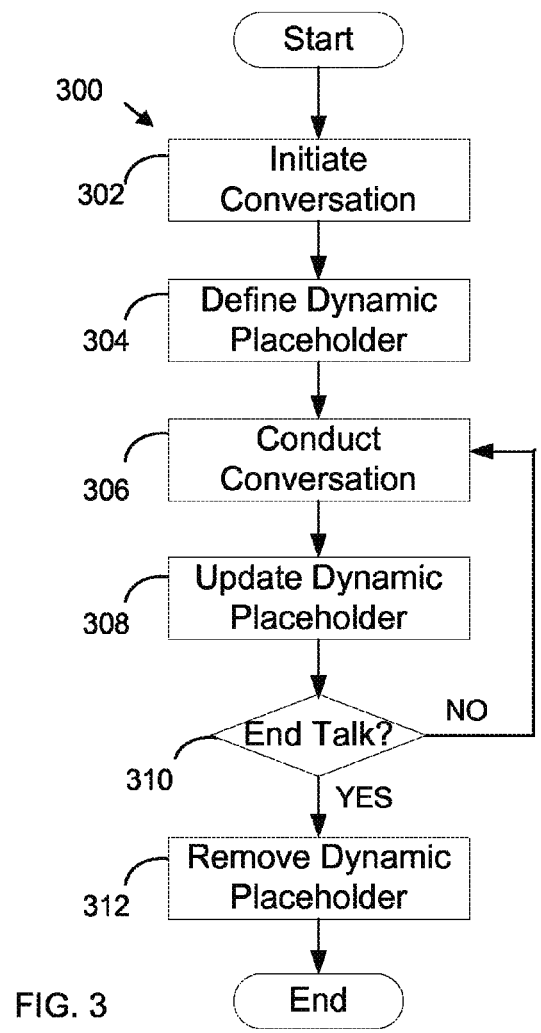
FIG. 3 is flow diagram showing operations for defining a communication session as a dynamic session and using a placeholder for accessing such a session in a message collection application in accordance with an embodiment.
Figure 4:
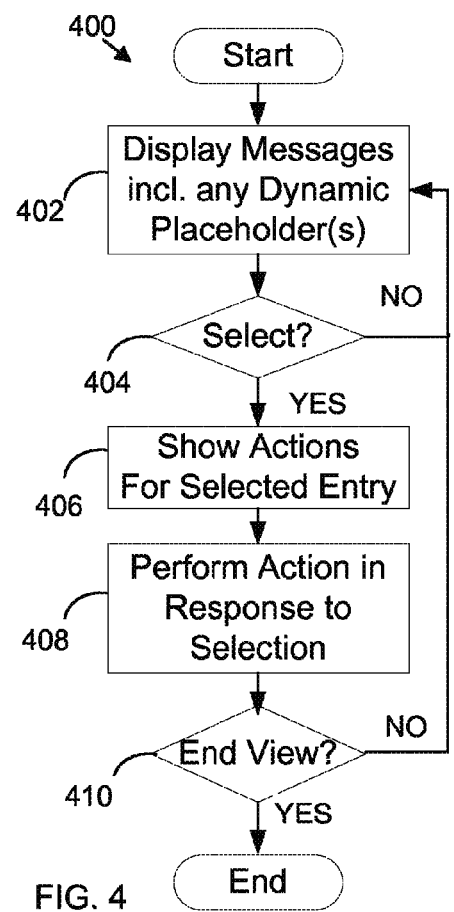
FIG. 4 is a flow diagram showing a message collection application displaying entries in accordance with any dynamic session placeholders.

With reference to FIGS. 3 and 4 there is illustrated operations for using a dynamic session placeholder in accordance with an embodiment. Persons of ordinary skill in the art will appreciate that such operations may be embodied within computer instructions (software) for configuring mobile station 202. With reference to operations 300, an IM session is initiated 302 between a user of device 202 and another remote user (not shown). A dynamic session placeholder is defined 304 for representing the session as an entry within a message collection application. The placeholder may comprise a data structure (not shown) for storing session data including a time stamp, other party, etc. The data structure may include the message data of the session of a link associating the placeholder to such data (e.g. as maintained by another application (i.e. an IM application) for conducting the session). At step 306, the conversation of the IM session is conducted as messages are sent and received and the dynamic placeholder is updated in response 308. If the conversation is not terminated (310), operations 306-308 are repeated as necessary. If at step 310 the conversation is ended (e.g. see view 1100) the dynamic placeholder may be removed 312 (or marked inactive for further re-use in some storage re-use embodiments).

With reference to operations 400, meanwhile, the message collection application GUI may be invoked to display messages including any dynamic placeholders for any active sessions (step 402). Example views are view 500, 700, 800 and 900. If a message is selected (404) the actions associated therewith may be displayed (406) (e.g. view 1000) otherwise operations loop to step 402. An action may be selected by a user (e.g. Open 1006) and invoked (step 408). Some actions will change control of mobile station 202 to end the current view of the message collection application such as by invoking another application. A determination of such may be made at step 410 so that operations 400 may then end or otherwise in response to the selected action of step 408, operations may loop to step 402. As the dynamic placeholder is updated by message activity of a session, the message collection application automatically displays the updated placeholder in response to the activity. As the time stamp changes or not, the placeholder's relative position in the list is changed. No change results in an aging placeholder and a new change moves the placeholder up the list.

The above-described embodiments are intended to be examples only. Those of skill in the art may effect alterations, modifications and variations to the particular embodiments without departing from the scope of the application. The subject matter described herein in the recited claims intends to cover and embrace all suitable changes in technology.

We claim:

1. A method of representing a conversation of related messages in a message collection user interface displayed on a wireless communication device, the message collection user interface displaying a list of messages from one or more communications applications on the computing device, the method comprising:
    defining a plurality of dynamic session placeholders, each dynamic session placeholder representing a respective conversation of related messages constituting a common messaging communication session;
    displaying the plurality of dynamic session placeholders in the message collection user interface, each dynamic session placeholder presented as a single entry in a list of messages and ordered, within the list of messages, chronologically according to a corresponding time of action of a last message in the conversation of related messages represented by the respective dynamic session placeholder;
    reordering the plurality of dynamic session placeholders within the list of messages, upon either transmission or receipt of a new message in the conversation of related messages represented by any one of the plurality of dynamic session placeholders, based on a time of action of the new message; and
    displaying the reordered list of messages.

2. The method of claim 1, wherein the dynamic session placeholder comprises a portion of the last message, an opposite messaging party, and a timestamp representing the time of action of the last message.

3. The method of claim 2, further comprising updating the time stamp of the dynamic session placeholder, in response to sending or receiving a new message, to include the time of action of the new message.

4. The method of claim 1, further comprising
    removing a dynamic session placeholder in response to an interruption of a respective conversation of related messages.

5. The method of claim 1, further comprising archiving a conversation of related messages in response to an interruption of a respective conversation of related messages.

6. The method of claim 1, further comprising:
    receiving a message unrelated to any conversation represented by any of the displayed plurality of dynamic session placeholders; and
    displaying the unrelated message in the list of messages.

7. The method of claim 1, further comprising:
    transmitting a message unrelated to any conversation represented by any of the displayed plurality of dynamic session placeholders; and
    displaying the unrelated message in the list of messages.

8. The method of claim 1, further comprising invoking an application associated with a message type of the related messages, in response to a selection of the dynamic session placeholder.

9. The method of claim 8, further comprising automatically opening the respective conversation of related messages constituting a common messaging communication session upon invoking the application associated with a message type of the related messages.

10. The method of claim 1, wherein the messages are instant messages.

11. A non-transient machine readable medium or media comprising program code which, when loaded into memory and executed on a processor of a wireless communications device, causes the processor to:
    define a plurality of dynamic session placeholders, each dynamic session placeholder representing a respective conversation of related messages constituting a common messaging communication session;

display the plurality of dynamic session placeholders in a message collection user interface, each dynamic session placeholder presented as a single entry in a list of messages and ordered, within the list of messages, chronologically according to a corresponding time of action of a last message in the conversation of related messages represented by the respective dynamic session placeholder;

reorder the plurality of dynamic session placeholders within the list of messages, upon either transmission or receipt of a new message in the conversation of related messages represented by any one of the plurality of dynamic session placeholders, based on a time of action of the new message; and display the reordered list of messages.

12. The non-transient machine readable medium or media of claim 11, wherein the dynamic session placeholder comprises a portion of the last message, an opposite messaging party, and a timestamp representing the time of action of the last message.

13. The non-transient machine readable medium or media of claim 12, further comprising code configured to cause the processor to update the time stamp of the dynamic session placeholder, in response to sending or receiving a new message, to include the time of action of the new message.

14. The non-transient machine readable medium or media of claim 11, further comprising code configured to cause the processor to remove a dynamic session placeholder in response to an interruption of a respective conversation of related messages.

15. The non-transient machine readable medium or media of claim 11, further comprising code configured to cause the processor to archive a conversation of related messages in response to an interruption of a respective conversation of related messages.

16. The non-transient machine readable medium or media of claim 11, further comprising code configured to cause the processor to:
   receive a message unrelated to any conversation represented by any of the displayed plurality of dynamic session placeholders; and
   display the unrelated message in the list of messages.

17. The non-transient machine readable medium or media of claim 11, further comprising code configured to cause the processor to:
   transmit a message unrelated to any conversation represented by any of the displayed plurality of dynamic session placeholders; and
   display the unrelated message in the list of messages.

18. The non-transient machine readable medium or media of claim 11, further comprising code configured to cause the processor to invoke an application associated with a message type of the related messages, in response to a selection of the dynamic session placeholder.

19. The machine readable medium of claim 18, further comprising code configured to cause the processor to automatically open the respective conversation of related messages constituting a common messaging communication session upon invoking the application associated with a message type of the related messages.

20. The non-transient machine readable medium or media of claim 11, wherein the messages are instant messages.

21. A wireless communication device comprising:
a processor;
a display electrically coupled to the processor; and
memory including machine-readable instructions executable by the processor, the instructions, when executed, causing the device to:
   define a plurality of dynamic session placeholders, each dynamic session placeholder representing a respective conversation of related messages constituting a common messaging communication session;
   display the plurality of dynamic session placeholders in a message collection user interface, each dynamic session placeholder presented as a single entry in a list of messages and ordered, within the list of messages, chronologically according to a corresponding time of action of a last message in the conversation of related messages represented by the respective dynamic session placeholder;
   reorder the plurality of dynamic session placeholders within the list of messages, upon either transmission or receipt of a new message in the conversation of related messages represented by any one of the plurality of dynamic session placeholders, based on a time of action of the new message; and
   display the reordered list of messages.

22. The device of claim 21, wherein the dynamic session placeholder comprises a portion of the last message, an opposite messaging party, and a timestamp representing the time of action of the last message.

23. The device of claim 22, wherein the instructions further cause the device to update the time stamp of the dynamic session placeholder, in response to sending or receiving a new message, in include the time of action of the new message.

24. The device of claim 21, wherein the instructions further cause the device to remove a dynamic session placeholder in response to an interruption of a respective conversation of related messages.

25. The device of claim 21, wherein the instructions further cause the device to archive a conversation of related messages in response to an interruption of a respective conversation of related messages.

26. The device of claim 21, wherein the instructions further cause the device to:
   receive a message unrelated to any conversation represented by any of the displayed plurality of dynamic session placeholders; and
   display the unrelated message in the list of messages.

27. The device of claim 21, wherein the instructions further cause the device to:
   transmit a message unrelated to any conversation represented by any of the displayed plurality of dynamic session placeholders; and
   display the unrelated message in the list of messages.

28. The device of claim 21, wherein the instructions further cause the device to invoke an application associated with a message type of the related messages, in response to a selection of the dynamic session placeholder.

29. The device of claim 28, wherein the instructions further cause the device to automatically open the respective conversation of related messages constituting a common messaging communication session upon invoking the application associated with a message type of the related messages.

30. The device of claim 21, wherein the messages are instant messages.

* * * * *